(12) United States Patent
Akashi (10) Patent No.: US 6,671,074 B2
(45) Date of Patent: Dec. 30, 2003

(54) OPTICAL RECEIVER FOR BURST TRANSMISSION SYSTEM

(75) Inventor: Tamotsu Akashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/171,558

(22) Filed: Jun. 12, 2002

(65) Prior Publication Data

US 2002/0154373 A1 Oct. 24, 2002

Related U.S. Application Data

(63) Continuation of application No. PCT/JP00/00808, filed on Feb. 14, 2000.

(51) Int. Cl.[7] .................. H04B 10/06; H04B 10/00; H03D 3/24
(52) U.S. Cl. ................. 359/189; 359/158; 375/375
(58) Field of Search ................. 359/189, 158; 375/354, 375, 376

(56) References Cited

U.S. PATENT DOCUMENTS

| 5,687,203 A | 11/1997 | Baba |
| 6,373,911 B1 * | 4/2002 | Tajima et al. ............... 375/375 |

FOREIGN PATENT DOCUMENTS

| EP | 0 921 654 A2 | 6/1999 |
| JP | 4-22234 | 1/1992 |
| JP | 6-85752 | 3/1994 |
| JP | 9-36849 | 2/1997 |

OTHER PUBLICATIONS

I. Phillips et al., "10–Gb/s Asynchronous Digital Optical Regenerator", IEEE Photonics Technology Letter, vol. 11, No.7, Jul. 1999.*
T. Kajiwara et al., "An Optical Receiver Design for ATM–PON Access System", IEEE, 1996.*
C. Su et al., "Theory of Burst–Mode Receiver and Its Applications to Optical Multiaccess Networks", Journal of Lightwave Technology, vol. 15, No. 4, Apr. 1997.*

* cited by examiner

Primary Examiner—Jason Chan
Assistant Examiner—Shi K. Li
(74) Attorney, Agent, or Firm—Katten Muchin Zavis Rosenman (57) ABSTRACT

The present invention is applicable to a burst transmission system such as an ATM-PON optical subscriber system. An optical receiver for extending tolerable variation of input signal is disclosed. The optical receiver includes; an optical signal receiver for receiving an optical signal in burst transmission to regenerate and reshape waveform of the received optical signal; and a bit synchronizer for detecting the rise and fall change points of the signal being output from the optical signal receiver using an externally-input clock, for determining a discrimination phase according to the detected change points; and for discriminating to output the received optical signal at the timing of the determined discrimination phase. The optical signal receiver provides an amplitude detector for detecting received optical signal intensity. Also, the bit synchronizer provides a phase selector for selecting a discrimination phase timing corresponding to the received optical signal intensity detected by the amplitude detector.

13 Claims, 6 Drawing Sheets

Received optical power

Table 1

| Control signal | | | | | Output data |
|---|---|---|---|---|---|
| S1 | S2 | S3 | S4 | P | Dout |
| 1 | 0 | 0 | 0 | 0 | D3 |
| 0 | 1 | 0 | 0 | 0 | D4 |
| 0 | 0 | 1 | 0 | 0 | D1 |
| 0 | 0 | 0 | 1 | 0 | D2 |
| 1 | 0 | 0 | 0 | 1 | D4 |
| 0 | 1 | 0 | 0 | 1 | D1 |
| 0 | 0 | 1 | 0 | 1 | D2 |
| 0 | 0 | 0 | 1 | 1 | D3 |

Data is not output in case of other combinations S1 – S4 shown in the above table.

FIG. 7

(a) In case of small signal input (b) In case of large signal input

FIG. 8

OPTICAL RECEIVER FOR BURST TRANSMISSION SYSTEM

This application is a continuation of PCT/JP00/00808, filed Feb. 14, 2000.

FIELD OF THE INVENTION

The present invention relates to an optical receiver for use in optical communication system, and more particularly an optical receiver for a system such as an ATM-PON optical subscriber system in which burst transmission is carried out.

BACKGROUND OF THE INVENTION

Figure 1:
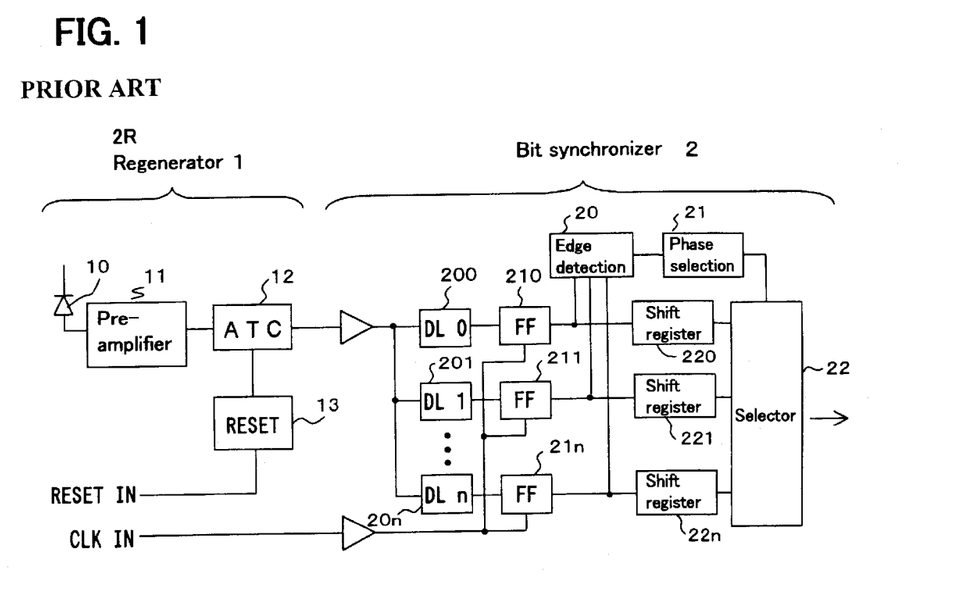
FIG. 1 shows an exemplary configuration of a conventional optical receiver corresponding to the burst transmission.

A configuration example of the conventional optical receiver corresponding to burst transmission is shown in FIG. 1. The 2R regenerator 1 shown in this example is the one published in B-1034 at the 1996 General Conference of the Communications Society of the IEICE (Institute of Electronic, Information and Communication Engineers).

Also, the bit synchronizer 2 is the one published in B-844 at the 1996 General Conference of the Communications Society of the IEICE. The above-mentioned 2R regenerator 1 is an optical signal receiver having functions of waveform regenerating and waveform reshaping against received light, in which a received optical signal is converted to a voltage signal through a photodiode 10 and a pre-amplifier 11. A binary signal is output after an ATC circuit 12 discriminates the signal in an amplitude direction.

ATC circuit 12 is provided with an automatic threshold value control function to discriminate and detect level '1' and level '0' by setting a threshold level in the middle of the received signal. A reset circuit 13 is provided for resetting the preset threshold value of ATC circuit 12.

Bit synchronizer 2 inputs the output signal of this 2R regenerator 1, to sample at multiphase timing using a system clock CLK being externally input. Further, using this sampled result, bit synchronizer 2 detects a rise change point (edge) and a fall change point on both sides of the input data to select the center phase therebetween to output as the optimal phase for data sampling.

More specifically, the output of 2R regenerator 1 is commonly input to a plurality of timing adjustment circuits (delay line) 200–20n. The outputs of timing adjustment circuits 200–20n are further input to the corresponding flip-flop circuits 210–21n. Here, the output data of 2R regenerator 1 are latched in multiphase at the inputs of flip-flop circuits 210–21n at the timing determined by the external clock CLK.

The outputs of flip-flop circuits 210–21n are input to the corresponding shift registers 220–22n, as well as to an edge detection circuit 20.

Edge detection circuit 20 detects change points of the input signal, namely both a rise edge and a fall edge of the output of 2R regenerator 1, from the outputs of flip-flop circuits 210–21n.

Accordingly, based on the detection result of the rise edge and the fall edge, a phase selection circuit 21 controls a selector 22 so as to select a shift register output corresponding to the data being latched at the timing of the center phase of the detected edges.

Here, in the above-mentioned configuration, the signal output of 2R regenerator 1 is inclined to fall into the state of varied pulse width caused by either nonlinear circuit operation or an error in setting a discrimination threshold value by an ATC circuit 12.

There may also be a case that the pulse width itself of the optical signal data received from the transmission side to input to 2R regenerator 1 has already been varied for such a reason as the characteristic of a laser on the transmission side. Therefore, bit synchronizer 2 is required to cope with such pulse width degradation in the input data.

Considering this issue, in the conventional configuration example shown in FIG. 1, a measure has been taken to cope with pulse width degradation by detecting the both edge sides, or a rise edge and a fall edge of the data, to determine the center phase therebetween as a discrimination phase.

However, the method of detecting both edge sides has a limit from the viewpoint of tolerance against the pulse width deterioration.

One example resulting from varied data width is shown below: Consider a case of an NRZ signal data having a pattern of '0100' being input with a duty ratio of 170%, and a case of a data with a pattern of '0110' being input with a duty ratio of 70%. It is not possible to distinguish these two cases as shown in FIG. 2 which illustrates a problem in the conventional optical receiver configuration.

Figure 2:
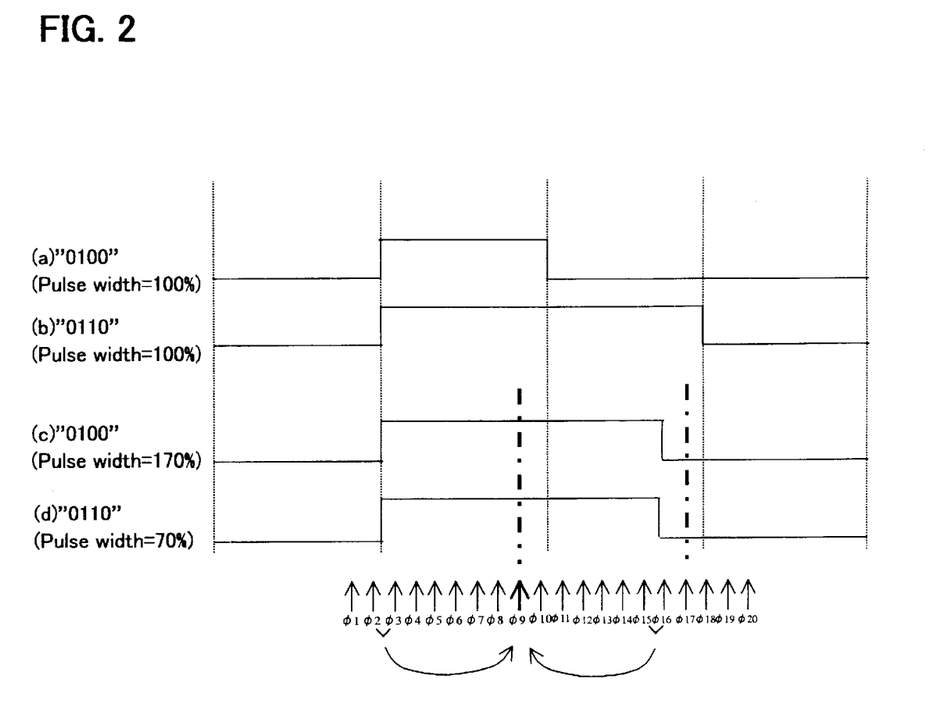
FIG. 2 shows an explanation diagram of a problem in the conventional optical receiver configuration.

Namely, as shown in FIGS. 2(a) and 2(b), for the cases of receiving '0100' and '0110' with a duty of 100%, consider that these data width are deteriorated resulting in such conditions that the respective data have duties of 170% and 70% as shown in FIGS. 2(c) and 2(d). In such cases the NRZ signal patterns become identical.

As a result of edge detection in edge detection circuit 20, there are two sets of the rise timing in phases ø2 and ø3, and also two sets of the fall timing in phases ø15 and ø16. Therefore, the timing position of phase ø9 being located at the center of those two positions is determined as the sampling position for each bit. As a result, in the case shown in FIG. 2(d), it is determined as '0' in the third bit, thus producing an error.

In order to circumvent the above-mentioned problem, there has been taken in such a conventional method a measure of restricting the tolerable pulse width variation value within the range of 50% to 150% for signals being input to bit synchronizer 2.

DISCLOSURE OF THE INVENTION

Accordingly, it is an object of the present invention to provide an optical receiver having an extended tolerable variation value of input signal pulse width for use in a system such as ATM-PON optical subscriber system in which burst transmission is carried out.

As a basic feature, the optical receiver to attain the object of the present invention includes; an optical signal receiver for receiving an optical signal in burst transmission to regenerate and reshape waveform of the received optical signal; and a bit synchronizer for detecting a rise change point and a fall change point of the signal being output from the optical signal receiver using an externally-input clock to determine a discrimination phase according to the detected change points, and to discriminate to output the received optical signal at the timing of the determined discrimination phase.

The above-mentioned optical signal receiver further includes an amplitude detector for detecting the received optical signal intensity, and also the above-mentioned bit synchronizer further includes a phase selector for selecting the discrimination phase timing corresponding to the received optical signal intensity detected by the amplitude detector.

Moreover, as a preferred embodiment of the present invention, the optical receiver includes; an opt-electric converter for converting a received optical signal into an electric signal; a pre-amplifier for amplifying the electric signal; an amplitude detector for detecting amplitude intensity of a signal output from the pre-amplifier; a main amplifier for amplifying the pre-amplifier output signal as well as for setting a discrimination threshold value to discriminate in the amplitude direction; a multiphase sampler for splitting an output signal of the main amplifier into a plurality of branch signals to apply mutually different delays to the each branch signal and thereafter to discriminate an input signal using the identical externally-input clock; a change-point detector for detecting a rise change point and/or a fall change point of a signal output from the multiphase sampler; a selection phase controller for outputting a control signal to determine a signal discrimination phase according to both the change point detection result from the change-point detector and a value detected by the amplitude detector; and a selection signal output portion for outputting a signal discriminated by the discrimination phase corresponding to the control signal being output from the selection phase controller, The above-mentioned selection phase controller generates a control signal for determining a signal output from the selection signal output portion according to the reception signal intensity detected by the amplitude detector.

Further scopes and features of the present invention will become more apparent by the following description of the embodiments with the accompanied drawings.

DETAILED DESCRIPTION OF THE PREFERRED EMBODIMENTS

The preferred embodiments of the present invention are described hereinafter referring to the charts and drawings, wherein like numerals or symbols refer to like parts.

Figure 3:
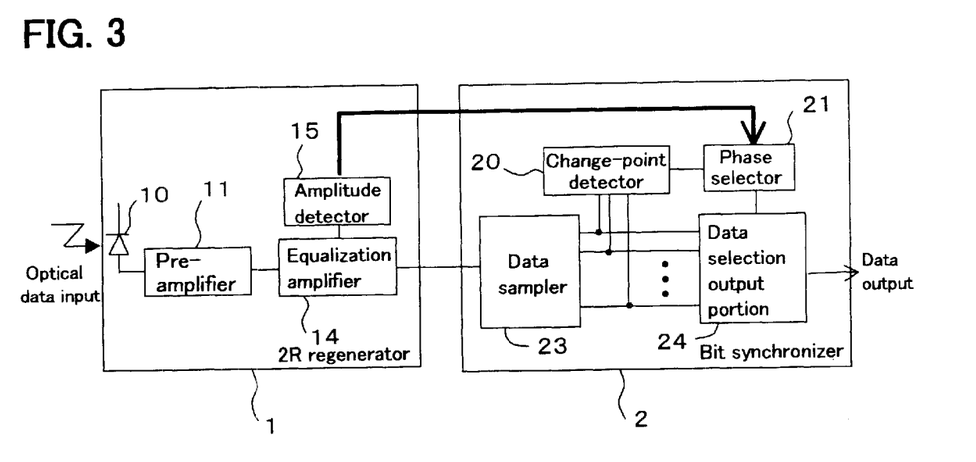
FIG. 3 shows an exemplary configuration block diagram according to the present invention.

FIG. 3 shows an example of a configuration block diagram of the optical receiver according to the present invention. Similar to the configuration shown in FIG. 1, in 2R regenerator 1, a received optical signal is converted into an electric signal (electric current) by a photodiode 10. The converted electric signal is further converted into a voltage signal by a pre-amplifier 11 to amplify to a predetermined electric voltage.

The output of pre-amplifier 11 is led to an equalization amplifier 14. Equalization amplifier 14 identifies the input signal in an amplitude direction to output a voltage signal having a predetermined amplitude value (an amplitude value capable of discriminating by a re-timing portion.)

In 2R regenerator 1, as a feature of the present invention, there is provided an amplitude detector 15 to detect the intensity of the received signal.

Meanwhile, the output of equalization amplifier 14 is input to a bit synchronizer 2. An exemplary configuration of bit synchronizer 2 is the same as the conventional configuration shown in FIG. 1. In other words, the output of equalization amplifier 14 is input to a data sampler 23 being constituted by timing adjustment circuits 200–20n and latch circuits 210–21n shown in FIG. 1.

In data sampler 23, a change-point detector 20 samples a signal in multiphase (multiple points) to detect rise change points and fall change points.

A phase selector 21 selects a phase according to the information from change-point detector 20 and amplitude detector 15. A data selection output portion 24 is constituted by shift registers 220–22n and selector 22 both of which have the same configurations as those shown in FIG. 1, to output the selected data according to the output of phase selector 21.

Here, in regard of the pulse width deterioration in the output waveform of 2R regenerator 1, one factor is caused by the transmitter on the opposite side (namely, in the case that pulse width of the received signal has already been deteriorated) and another factor is caused by 2R regenerator 1.

The pulse width variation in the transmitter is determined by a pulse mask specification in the transmitter. For example, in case of ATM-PON system, tolerable pulse width variation in a transmitter is specified as ±15% in ITU-T Recommendation G983.1. In 2R regenerator 1, the pulse width is not deteriorated when an input signal is small enough to range within linear amplification by pre-amplifier 11. However, when the input signal becomes larger and enters into non-linear range of pre-amplifier 11, distortion in the pulse width is produced.

Figure 4:
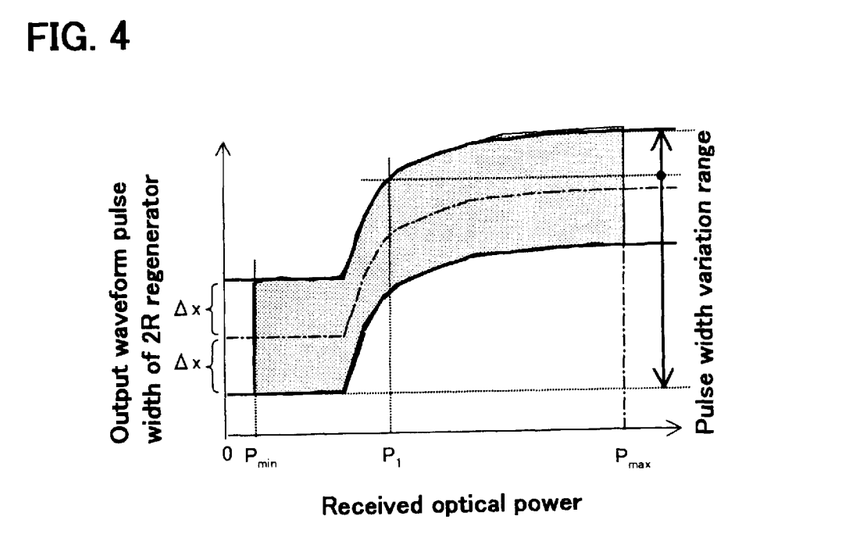
FIG. 4 shows an explanation diagram of pulse width variation range and a cause thereof.

Therefore, as a range of pulse width variation of the signal output from 2R regenerator 1, an exemplary area is shown as a meshed portion in FIG. 4 illustrating the range of pulse width variation and the cause thereof. Namely, in FIG. 4, the horizontal axis denotes optical receiving power and the vertical axis denotes pulse width of the output waveform from 2R regenerator 1. The pulse width variation range is obtained from the summation of the pulse width variation generated in the 2R regenerator only (shown by a dot and dash line) and the pulse width deterioration in the transmitter (±Δ).

The present invention utilizes the fact that the pulse width distortion in such 2R regenerator 1 is correlated with the input signal power.

Referring back to FIG. 3, the received optical signal is converted to the electric signal by photodiode 10, pre-amplifier 11 and equalization amplifier 14. At this time, amplitude detector 15 detects the intensity of the optical input signal.

In data sampler 23 of bit synchronizer 2, the electric signal output from equalization amplifier 14 is sampled in multiphase (as one embodiment, $\varphi1$–$\varphi20$) as shown in FIG. 2.

In change-point detector 20, the change points in the directions of both rise (between $\varphi2$ and $\varphi3$) and fall (between ø15 and ø16) are detected. As mentioned earlier, because the pulse width distortion has correlation with the input signal power (the pulse width deterioration of being extended more when the input signal power becomes larger), phase selector 21 determines that the bit pulse of '1' becomes wider when the received power detected by amplitude detector 15 is no less than the predetermined value P1 (refer to FIG. 2(c) and FIG. 4).

At this time, phase selector 21 selects the phase of (ø3+ø15)/2→ø9.

Meanwhile, when the received power is no more than p1, phase selector 21 determines that the bit of '11' is detected, thus deviating the sampling position for eight phases which correspond to one time-slot. Thus phase selector 21 selects the phase of (ø3+ø15−ø8)/2→ø5.

Data selection output portion 24 outputs a data according to the selection indication from phase selector 21. Accordingly, in FIG. 2(d), '0110' is correctly detected by sampling.

In the aforementioned embodiment shown in FIG. 3, use of external clock CLK has been explained. However, as methods for obtaining multiphase timing, it may also be possible either to employ a plurality of clocks CLK having mutually different phases, or to use a higher speed clock to be frequency-divided by N.

Also, when S/N of the signal is worse, the phase selection may possibly be determined incorrectly. For this reason, instead of determining the phase selection based on one sampling result only, it may also be possible to employ in phase selector 21 such a method as to sample for a plurality of times to obtain an average value of a rise change point or a fall change point of the signal to control the discrimination phase.

Figure 5:
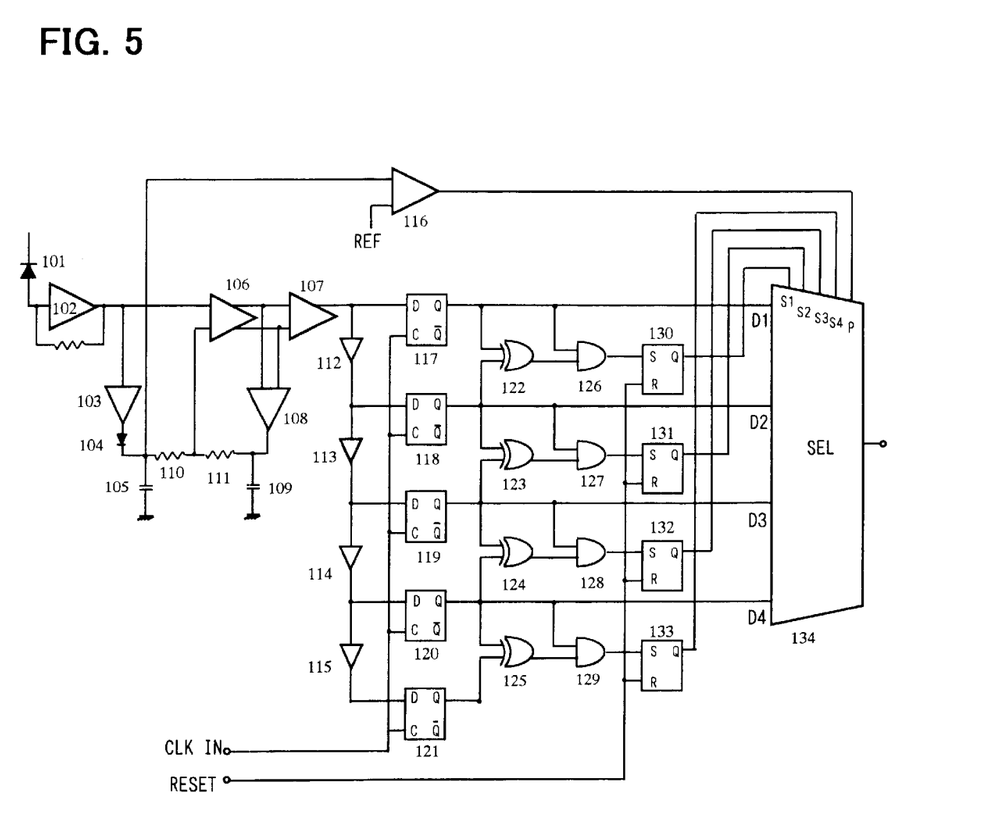
FIG. 5 shows a typical circuit example of the present invention corresponding to the embodiment shown in FIG. 3.

FIG. 5 shows a typical circuit configuration according to the present invention, which corresponds to the embodiment shown in FIG. 3. The different point is that only either the rise change point or the fall change point of the received optical signal is detected to control the sampling phase.

In FIG. 5, the received optical signal is converted to electric current by photodiode 101 to convert to an electric voltage signal by pre-amplifier 102. A peak detection circuit constituted by amplifier 103, diode 104 and capacitor 105 detects the peak amplitude value output from pre-amplifier 102.

A DC feedback amplifier constituted by an amplifier 108 and a capacitor 109 detects a signal '0' level. Each value of the detected peak voltage and the detected '0' level voltage is divided into a half (½) by resistors 110, 111 having the identical resistance value, to set the threshold value of amplifier 106 to a half of the signal amplitude.

An amplifier 107 amplifies the signal so that an amplitude value required for discrimination in D-flip-flops (FF) 117–121 disposed at a later stage. A voltage comparator 116 compares the output voltage of the peak detection circuit (a storage voltage in capacitor 105) with the reference voltage (REF).

Accordingly, in FIG. 5, the above-mentioned peak detection circuit and voltage comparator 116 realize the function corresponding to amplitude detector 15 shown in FIG. 3. When a peak detection output voltage is greater than the reference voltage (REF), a voltage having logic level of '1' is output by voltage comparator 116.

Meanwhile, the output signal from amplifier 107 is formed into a four-phase signal by fixed delay elements 112–115 constituting a portion of data sampler 23, the delay amount of which is set as one-fourth (¼) of the transmission speed $f_0$.

Further, in other portions of data sampler 23, the signal is discriminated in the corresponding D-flip-flops (D-FF) 117–121 by an externally input clock CLK.

Two outputs of neighboring D-FF pair are exclusive-ORed in exclusive-OR circuits (EX-OR) 122–125. Through this exclusive-OR operation, the output '1' is produced only when a code of one output differs from that of the other. Further, the rise edge of the input signal is detected by performing AND operation with the signal itself having discriminated the signal using AND gates 126–129.

In addition, by inserting an inverter at each input end of AND gates 126–129 to which the outputs of the corresponding D-FF 117–121 are input respectively, it becomes possible to detect the fall edge of the input signal at the output ends of AND gates 126–129.

According to the detection result from AND gates 126–129, a selector 134 determines a signal having any particular sampling phase to select to output. Here, the outputs of each AND gate 126–129 is retained in each SR-FF 130–133 until the succeeding reset signal is input.

Selector 134 selects an output data from the outputs of AND gates 126–129. Further at that time, the selected output is changed by a signal p being output from comparator 118.

Compared with FIG. 3, selector 134 shown in FIG. 5 corresponds to phase selector 21 and data selection output portion 24 in FIG. 3.

As in the configuration shown in FIG. 5, in a practical application of the present invention, when it is known that the pulse width variation hardly occurs on the transmission side, or when the pulse width variation characteristic on the reception side is known, substantially the most appropriate sampling phase can be selected by detecting either one of the rise edge or the fall edge among the change points.

By selecting either one side of the change points, the circuit amount can be decreased thus bringing about reduced power consumption.

Figure 6:
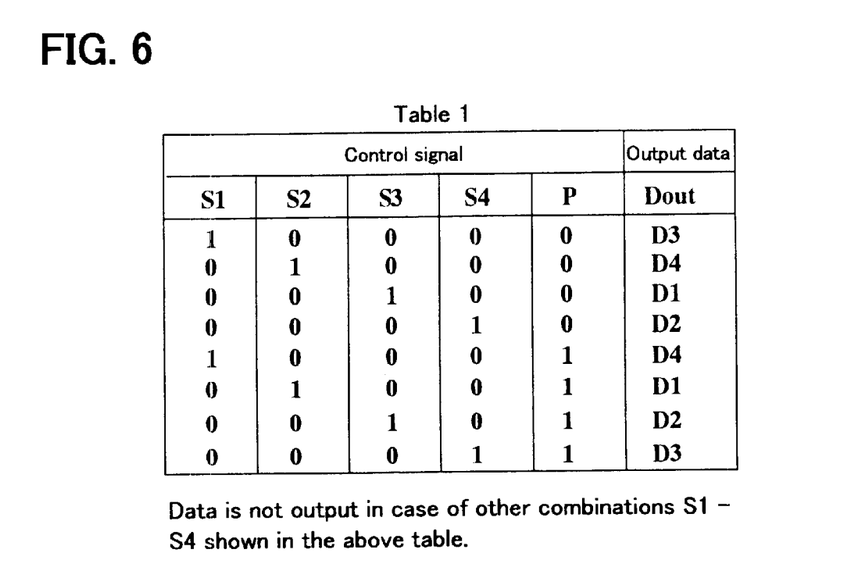
FIG. 6 shows a table 1 for denoting a relation between selected output data of selector 134 and control signals S1–S4 and P in the embodiment of the present invention shown in FIG. 5.

In table 1 of FIG. 6, the relation between the selected output data by selector 134, control signals S1–S4 and p are shown. In this table, when an input signal having smaller value than the reference value (REF) determined by voltage comparator 116 is input, control signal P becomes '0', whereas control signal P becomes '1' when the input signal is larger than the reference value (REF). Corresponding to the combination of control signals S1–S4, any output data D1–D4 is selected to output.

Figure 7:
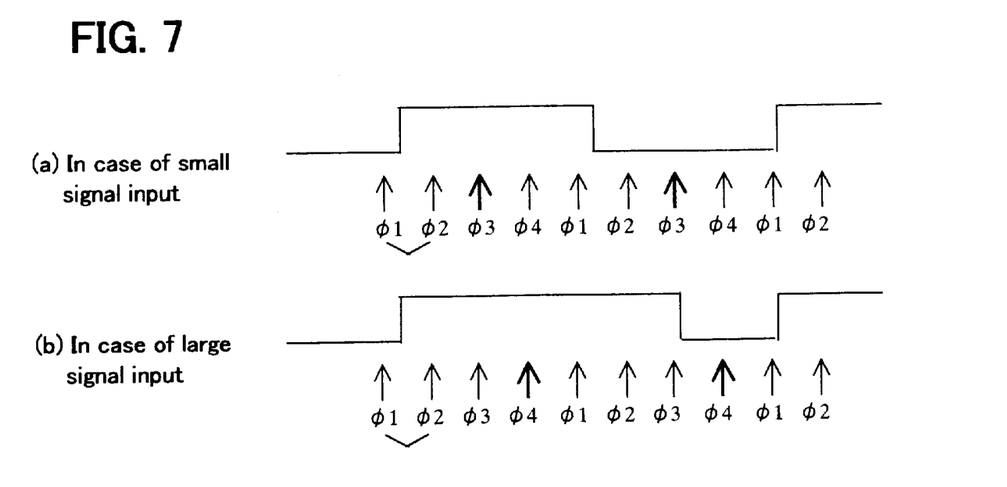
FIG. 7 shows an example of shifting a sampling phase using the data signal rise as a reference point.

The above-mentioned relation can be understood from the phase relation shown in FIG. 7. In FIG. 7, there is shown an example that a sampling phase is shifted referencing from the fall of the data signal. As an embodiment, setting the data rise phase (ø1–ø2) as a reference, in case a small signal is input (FIG. 7(a)), a phase timing of ø3 is selected as a sampling timing. On the other hand, in case a large signal is input (FIG. 7(b)), a phase timing ø4 being shifted further is selected as a sampling timing.

Figure 8:
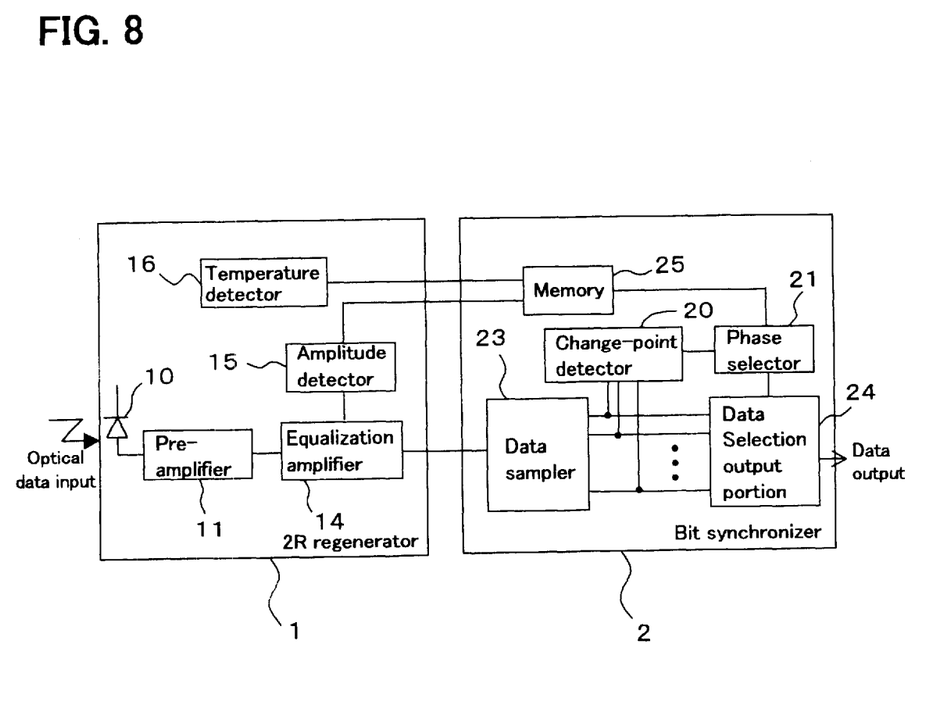
FIG. 8 shows another embodiment of the present invention.

In FIG. 8, a configuration according to another embodiment of the present invention is shown. In the aforementioned embodiment shown in FIG. 3, only non-linear area of pre-amplifier 11 is considered as output pulse width distortion of 2R regenerator 1. However, there are cases of pulse width variation caused by offset, temperature characteristic, or the like, in the amplifier constituting equalization amplifier 14.

When comparing the embodiment shown in FIG. 1, the above-mentioned matter is taken into consideration in the configuration shown in FIG. 8. Namely, there are additionally provided a temperature detector 16 in 2R regenerator 1, and also a memory 25 in bit synchronizer 2.

Temperature detector 16 detects an ambient temperature, while memory 25 stores the amount of pulse width distortion in 2R regenerator 1 as a function of the ambient temperature and the reception optical power. Accordingly, from memory 25, a control signal P is read out, which corresponds to the combination of the ambient temperature detected by temperature detector 16 and the reception optical power detected by amplitude detector 15.

The read-out data corresponding to this control signal P is obtained from data selection output portion 24.

INDUSTIAL APPLICABILITY

As the present invention has been described, using the optical receiver according to the present invention, it becomes possible to extend tolerable variation in signal pulse width being input into bit synchronizer 2. As a result, an effect of facilitating the design of 2R regenerator 1 can be attained.

The embodiments of the present invention were explained referring to the charts and drawings. However, the foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An optical receiver comprising;
    an optical signal receiver for receiving an optical signal in burst transmission to regenerate and reshape a waveform of said received optical signal; and
    a bit synchronizer for detecting a rise change point and/or a fall change point of the signal being output from said optical signal receiver using an externally-input clock to determine a discrimination phase according to said detected change points, and to discriminate to output said received optical signal at the timing of said determined discrimination phase,
    wherein said optical signal receiver includes an amplitude detector for detecting said received optical signal intensity, and said bit synchronizer includes a phase selector for selecting said discrimination phase timing corresponding to said received optical signal intensity detected by said amplitude detector.

2. The optical receiver according to claim 1 further comprising:
    a memory for storing in advance the correlation between received optical signal amplitude and input signal pulse width of said bit synchronizer,
    wherein a discrimination phase of said bit synchronizer is controlled by comparing the received signal intensity detected by said amplitude detector with a value stored in said memory.

3. The optical receiver according to claim 2 further comprising:
    a temperature detector for detecting an ambient temperature,
    wherein said memory further stores in advance the correlation between received signal intensity and input signal pulse width of said bit synchronizer in a plurality of ambient temperatures to read out said correlation stored in said memory using both said ambient temperature detected by said temperature detector and the received signal intensity, to control a discrimination phase of said bit synchronizer based on said correlation.

4. The optical receiver according to claim 1 wherein a plurality of samplings are carried out between said detected rise change point and fall change point to control a discrimination phase of said bit synchronizer using an average phase value of said plurality of samplings.

5. An optical receiver comprising:
    an opt-electric converter for converting a received optical signal into an electric signal;
    a pre-amplifier for amplifying said electric signal;
    an amplitude detector for detecting amplitude intensity of a signal output from said pre-amplifier;
    a main amplifier for amplifying said pre-amplifier output signal as well as for setting a discrimination threshold value to discriminate in the amplitude direction;
    a multiphase sampler for splitting an output signal of said main amplifier into a plurality of branch signals to apply mutually different delays to said each branch signal and for discriminating an input signal using the identical externally input clock;
    a change-point detector for detecting a rise change point and/or a fall change point of a signal output from said multiphase sampler;
    a selection phase controller for outputting a control signal to determine a signal discrimination phase according to both said change point detection result from said change-point detector and a value detected by said amplitude detector; and
    a selection signal output portion for outputting a signal discriminated by said discrimination phase corresponding to said control signal being output from said selection phase controller,
    wherein said selection phase controller generates a control signal for determining a signal output from said selection signal output portion according to the reception signal intensity detected by said amplitude detector.

6. The optical receiver according to claim 5 further comprising:
    a memory for storing in advance the correlation between received optical signal amplitude and signal pulse width of said main amplifier output,
    wherein a discrimination phase determined by a control signal of said selection phase controller is controlled by comparing the received signal amplitude detected by said amplitude detector with a value stored in said memory.

7. The optical receiver according to claim 6 further comprising:
    a temperature detector for detecting an ambient temperature,
    wherein said memory further stores in advance the correlation between received signal intensity and output signal pulse width of said main amplifier in a plurality of ambient temperatures to read out said correlation stored in said memory using said ambient temperature detected by said temperature detector and said received signal intensity, to control a discrimination phase determined by said control signal of said selection phase controller based on said correlation.

8. An optical receiver comprising:
    an opt-electric converter for converting a received optical signal into an electric signal;
    a pre-amplifier for amplifying said electric signal;

an amplitude detector for detecting amplitude intensity of a signal being output from said pre-amplifier;

a main amplifier for amplifying said pre-amplifier output signal and for setting a discrimination threshold value to discriminate in the amplitude direction;

a multiphase sampler for splitting an output signal of said main amplifier into a plurality of branch signals to discriminate each branch signal using a plurality of externally input clocks having mutually different phases;

a change-point detector for detecting a rise change point and/or a fall change point from an output signal of said multiphase sampler;

a selection phase controller for outputting a control signal to determine a signal discrimination phase according to said change point detection result from said change-point detector and a value detected by said amplitude detector; and a selection signal output portion for outputting a signal discriminated by said discrimination phase corresponding to said control signal being output from said selection phase controller, wherein said selection phase controller generates a control signal for determining a signal output from said selection signal output portion according to the reception signal intensity detected by said amplitude detector.

9. The optical receiver according to claim 8 further comprising:

a memory for storing in advance the correlation between received optical signal amplitude and signal pulse width of said main amplifier output, wherein a discrimination phase determined by a control signal of said selection phase controller is controlled by comparing the received signal amplitude detected by said amplitude detector with a value stored in said memory.

10. The optical receiver according to claim 9 further comprising:

a temperature detector for detecting an ambient temperature, wherein said memory further stores in advance the correlation between received signal intensity and output signal pulse width of said main amplifier in a plurality of ambient temperatures to read out said correlation stored in said memory using said ambient temperature detected by said temperature detector and said received signal intensity, to control a discrimination phase determined by said control signal of said selection phase controller based on said correlation.

11. The optical receiver according to claim 8 wherein said externally-input clocks having mutually different phases are multiphase clocks being generated by frequency-dividing an externally-input high-speed clock having N times faster (N is an integer).

12. The optical receiver according to claim 11 further comprising:

a memory for storing in advance the correlation between received optical signal amplitude and signal pulse width of said main amplifier output, wherein a discrimination phase determined by a control signal of said selection phase controller is controlled by comparing the received signal amplitude detected by said amplitude detector with a value stored in said memory.

13. The optical receiver according to claim 12 further comprising:

a temperature detector for detecting an ambient temperature, wherein said memory further stores in advance the correlation between received signal intensity and output signal pulse width of said main amplifier in a plurality of ambient temperatures to read out said correlation stored in said memory using said ambient temperature detected by said temperature detector and said received signal intensity, to control a discrimination phase determined by said control signal of said selection phase controller based on said correlation.

* * * * *